United States Patent
Tonkovich et al.

(10) Patent No.: US 6,540,975 B2
(45) Date of Patent: Apr. 1, 2003

(54) METHOD AND APPARATUS FOR OBTAINING ENHANCED PRODUCTION RATE OF THERMAL CHEMICAL REACTIONS

(75) Inventors: Anna Lee Y. Tonkovich, Pasco, WA (US); Yong Wang, Richland, WA (US); Robert S. Wegeng, Richland, WA (US); Yufei Gao, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/123,779

(22) Filed: Jul. 27, 1998

(65) Prior Publication Data

US 2002/0031471 A1 Mar. 14, 2002

(51) Int. Cl.$^7$ .............................. C01B 3/26; C01B 3/16; C07C 1/02; B01J 8/04; F28D 7/00
(52) U.S. Cl. ................... 423/659; 252/373; 422/190; 422/198; 422/200; 422/236; 423/651; 423/652; 423/656
(58) Field of Search ............. 252/373; 423/650, 423/651, 652, 655, 656, 659; 422/190, 198, 236, 200

(56) References Cited

U.S. PATENT DOCUMENTS

| | | | | |
|---|---|---|---|---|
| 3,823,743 A | * | 7/1974 | King ........................... 138/42 |
| 4,795,618 A | | 1/1989 | Laumen ...................... 422/202 |
| 5,494,653 A | * | 2/1996 | Paisley ........................ 423/652 |
| 5,533,890 A | * | 7/1996 | Holst et al. ..................... 431/5 |
| 5,565,009 A | * | 10/1996 | Ruhl et al. ................. 48/197 R |
| 5,637,283 A | * | 6/1997 | Stilger et al. ............. 423/245.1 |
| 5,660,800 A | * | 8/1997 | Mieville et al. ............. 422/173 |
| 6,059,961 A | * | 4/1998 | Koves et al. ............... 208/146 |
| 5,766,458 A | * | 6/1998 | Sekhar et al. ............... 210/184 |
| 6,200,536 B1 | * | 3/2001 | Tonkovich et al. .......... 422/177 |

FOREIGN PATENT DOCUMENTS

| WO | WO 96/32188 | 10/1996 | ........................ 8/2 |
|---|---|---|---|
| WO | WO 97/39490 | 10/1997 | ........................ 8/24 |

* cited by examiner

*Primary Examiner*—Wayne A. Langel
*Assistant Examiner*—Jonas N. Strickland
(74) *Attorney, Agent, or Firm*—Stephen May; Frank Rosenberg

(57) ABSTRACT

The present invention is a method and apparatus (vessel) for providing a heat transfer rate from a reaction chamber through a wall to a heat transfer chamber substantially matching a local heat transfer rate of a catalytic thermal chemical reaction. The key to the invention is a thermal distance defined on a cross sectional plane through the vessel inclusive of a heat transfer chamber, reaction chamber and a wall between the chambers. The cross sectional plane is perpendicular to a bulk flow direction of the reactant stream, and the thermal distance is a distance between a coolest position and a hottest position on the cross sectional plane. The thermal distance is of a length wherein the heat transfer rate from the reaction chamber to the heat transfer chamber substantially matches the local heat transfer rate.

42 Claims, 3 Drawing Sheets

METHOD AND APPARATUS FOR OBTAINING ENHANCED PRODUCTION RATE OF THERMAL CHEMICAL REACTIONS

This invention was made with Government support under Contract DE-AC0676RLO1830 awarded by the U.S. Department of Energy. The Government has certain rights in the invention.

FIELD OF THE INVENTION

The present invention relates to a method and apparatus for thermal chemical reactions. More specifically, the method and apparatus provide an enhanced reaction rate for the thermal chemical reaction.

As used herein, the term thermal chemical reaction(s) includes exothermic and endothermic chemical reactions.

BACKGROUND OF THE INVENTION

Thermal chemical reactions including exothermic and endothermic chemical reactions are well known. Examples of thermal chemical reactions include but are not limited to Hydrogen and Hydrocarbon conversion reactions including but not limited to steam reforming, water-gas shift reactions and combustion are well known. These reactions are usually carried out in the presence of a catalyst at temperatures up to about 1000° C. Because the intrinsic kinetics of the thermal chemical reaction are much faster than the heat transfer rate between the reaction vessel and the thermal sink or environment, the rate of product production is limited. Limited production rates may be characterized in terms of residence time which is typically seconds to minutes in convention thermal chemical reaction vessels.

For example, the water gas shift reaction is conventionally carried out in fixed bed reactors. The water gas shift reaction of converting carbon monoxide and water to carbon dioxide and hydrogen suffers from multiple-second residence times (kinetic impediment) when carried out in fixed bed reactors. Theoretical kinetics suggests possible residence times on the order of milliseconds. There are two kinetic retarding aspects to conventional reactors. The first is a diffusion limitation as reactants diffuse into and out of a catalyst bearing porous pellet and the second is a heat transfer limitation which is a combination of heat transfer parameters (conduction, length) of catalyst supports and overall reactor geometry (shape and size). Because the water gas shift reaction is critical to a multi-reactor fuel processing system that supports distributed energy production through the use of a fuel cell, there is a need for a smaller, faster water gas shift reactor.

Another example is conventional methane steam reforming reactor produces synthesis gas at an average residence time of several seconds and with an effectiveness factor of 0.01 to 0.05 reported by Adris, A., Pruden, B., Lim, C., J. Grace, 1996, On the reported attempts to radically improve the performance of the steam methane reforming reactor, Canadian Journal of Chemical Engineering, 74, 177–186. In typical industrial operation, the methane to steam ratio is run at 3:1 to prevent coke formation.

Efforts to improve heat transfer between the reaction vessel and the thermal sink have made only modest improvements in product production rate. Thus, there is a need in the art of thermal chemical reactions for a method and apparatus that increases the heat transfer rate between the reaction vessel and the thermal sink and thereby approach the theoretical intrisic kinetic rate of reaction and production.

SUMMARY OF THE INVENTION

The present invention is a method and apparatus for obtaining an enhanced production rate per reaction chamber volume of a reaction chamber with an inlet and an outlet for a thermal chemical reaction, wherein a ratio of the enhanced production rate per reaction chamber volume to a conventional production rate per conventional reaction chamber volume for the thermal chemical reaction is at least 2. For example, for convention steam reforming residence time is on the order of seconds whereas with the present invention, residence time is less than a factor of 2, on the order of milliseconds. The method and apparatus rely upon;

(a) a porous insert within the reaction chamber volume, wherein a reactant flow substantially completely passes through the porous insert wherein the reaction chamber volume with the porous insert has a mean porosity less than 1 and a transport distance no greater than 3 mm;

(b) the reaction chamber volume with a length parallel to a bulk reactant flow, the length less than or equal to 6 inches, and with a height less than or equal to 2 inches, thereby transferring reaction heat at an enhanced heat transfer rate through the porous insert; and (c) a heat transfer chamber in thermal contact with the reaction chamber volume, the heat transfer chamber transferring heat at said enhanced heat transfer rate across a wall between the heat transfer chamber and the reaction chamber, thereby obtaining the enhanced production rate per reaction chamber volume for the thermal chemical reaction wherein a ratio of the enhanced production rate per reaction chamber volume to a conventional production rate per conventional reaction chamber volume for the thermal chemical reaction is at least 2.

These features have been found to cooperate with the reaction kinetics in terms of transferring heat at a rate sufficient to avoid substantial impediment of the kinetics. These features are effective for both catalytic and non-catalytic thermal chemical reactions. For catalytic chemical reactions, addition of a catalyst upon the porous insert permits flow of reactants past catalyst sites rather than limiting reactant motion to diffusion as in conventional systems. Thus, according to the present invention, for catalytic thermal chemical reactions, both kinetic impediments are substantially reduced permitting realization of theoretical or near theoretical reaction kinetics. More specifically, a water gas shift reactor made according to the present invention has $\frac{1}{10}^{th}$ to $\frac{1}{100}^{th}$ the size of conventional processing hardware for the same production output.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1A:
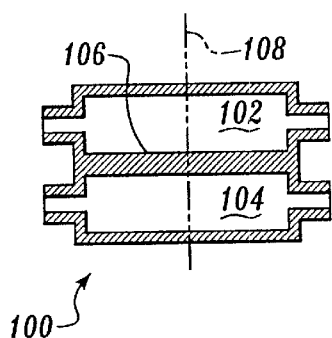
FIG. 1a is a cross section of a stacked reaction chamber with heat exchanger chamber.
Figure 1B:
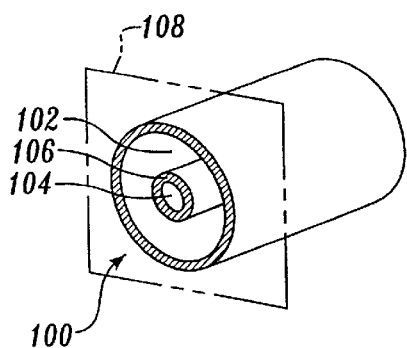
FIG. 1b is an isometric of a nested reaction chamber with heat exchanger chamber.

Referring to FIGS. 1a and 1b, a vessel 100 for thermal chemical reactions the vessel having two chambers 102 and 104 with a wall 106 therebetween. Either of the two chambers 102, 104 may be the reaction chamber. Bulk flow of reactants within the reaction chamber 102 is substantially perpendicular to a cross section plane 108. The vessel 100 may have stacked chambers as in FIG. 1a or nested chambers as in FIG. 1b. The reaction in the reaction chamber may be endothermic or exothermic.

In a thermal chemical reaction, the rate of production (reaction kinetics) is limited by the rate of heat transfer either to (endothermic) or from (exothermic) the reaction site. In order to obtain an enhanced heat transfer rate and thereby an enhanced production rate, the reaction chamber has a porous insert (not shown) within the reaction chamber volume wherein the reaction chamber volume with the porous insert has a mean porosity less than 1 and a transport distance no greater than 3 mm, thereby transferring reaction heat at an enhanced heat transfer rate through the porous insert.

The porous insert may be a powder, a porous monolith (including but not limited to metal or ceramic foam, honeycomb, tube bank, stacked microchannel assembly, and combinations thereof, fibers (e.g. steel wool), or combinations thereof. In view of the cost of replacing spent catalyst, for catalytic reactors, it is preferred that the porous insert be removable from the reaction chamber. The porous insert may be arranged to provide single or multiple flow passages for reactants through the reaction chamber volume. The porous insert may rest on or contact raised features formed on the interior surface(s) of the reaction chamber.

For catalytic thermal chemical reactions, a preferred porous insert is a porous support with a catalyst material thereon. More preferred is a porous insert with a solution deposited interfacial layer between the porous support and the catalyst material. A more preferred porous insert has a buffer layer between the porous support and the interfacial layer.

In addition, the reaction chamber volume has a length parallel to a bulk reactant flow, the length less than or equal to 6 inches, and has a height less than or equal to 2 inches. The limited length and height provide short distances for the projections thereby permitting faster heat transfer. Moreover, the short length reduces overall pressure drop through the reaction chamber.

The heat transfer chamber is in thermal contact with the reaction chamber volume, the heat transfer chamber transferring heat at the enhanced heat transfer rate across the wall 106 between the heat transfer chamber and the reaction chamber, thereby obtaining the enhanced production rate per reaction chamber volume for the thermal chemical reaction.

The interfacial layer is a solution deposited metal oxide. The solution deposited metal oxide includes but is not limited to $\gamma Al_2O_3$, $SiO_2$, $ZrO_2$, $TiO_2$, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. Typically the porous support has a thermal coefficient of expansion different from that of the interfacial layer. Accordingly, for high temperature catalysis (T>150° C.) a buffer layer is needed to transition between the two coefficients of thermal expansion.

The buffer layer is a metal oxide that is $Al_2O_3$, $TiO_2$ and combinations thereof. More specifically, the $Al_2O_3$ is $\alpha$-$Al_2O_3$, $\gamma$-$Al_2O_3$ and combinations thereof. It is more resistant against oxygen diffusion. Therefore, it is expected that resistance against high temperature oxidation can be improved with alumina coated foam. When the porous substrate 100 is metal foam, a preferred embodiment has a buffer layer formed of two sub-layers. The first sublayer is $\alpha$-$Al_2O_3$ for passivating the metal foam and the second layer is $TiO_2$ for bonding to the interfacial layer.

Deposition of the buffer layer 102 may be by vapor deposition including but not limited to chemical vapor deposition, physical vapor deposition or combinations thereof. Because the vapor deposition is conducted at high temperatures, polycrystalline phases are formed providing good adhesion of the metal oxide to the metal foam surface.

Alternatively, the buffer layer 102 may be obtained by solution coating. The solution coating has the steps of metal surface functionalization via hydroxide formation, followed by surface hydrolysis of alkoxides to obtain the polycrystalline phases. This solution coating may be preferred as a lower cost method of depositing the buffer layer 102.

Polycrystalline metal oxides resist flaking off under thermal cyclings. The open cells of a metal foam may range from about 20 ppi to about 1000 ppi and is preferably about 80 ppi. The catalyst material (when used) is deposited onto the interfacial layer. The catalyst material may be any catalyst metal including but not limited to noble metal, transition metal and combinations thereof, or a catalyst metal oxide or transition metal oxide including but not limited to magnesium oxide, titanium oxide, vanadium oxide, chromium oxide, manganese oxide, iron oxide, nickel oxide, cobalt oxide, copper oxide, zinc oxide, zirconium oxide, molybdenum oxide, tin oxide, calcium oxide, aluminum oxide, silicon oxide, lanthanum series oxide(s), zeolite (s) and combinations thereof.

The method of making the preferred catalyst has the steps of selecting a porous support, vapor depositing a buffer layer on the porous support, solution depositing a interfacial layer thereon, and depositing a catalyst metal onto the interfacial layer. When a metal foam is used as the porous support, the metal foam is etched prior to vapor depositing the buffer layer. Etching is preferably with an acid, for example HCl. Optionally a catalyst layer may be deposited onto the interfacial layer.

EXAMPLE 1

An experiment was conducted to demonstrate a chemical thermal reactor according to the present invention using the water gas shift reaction.

A first porous insert was made with a catalyst material of a pre-reduced and stabilized 5-wt % $Ru/ZrO_2$ catalyst (⅛-inch extrudates) obtained from Degussa Corporation. The catalyst material was ground and sieved to 65 to 100 mesh.

A second porous insert was made with Ni metal foam with 80 pores per inch (ppi) machined to fit in a 7 mm ID quartz tube, ranging from 0.5 to 2.5 cm in length. The metal foam was washed in a sonicator with acetone, chloroform, and water successively over 10-minute intervals. It was also etched in a 1M HCl solution at 60° C. for 30 min. The etched metal foam was saturated with a zirconium n-propoxide/1-propanol solution (Aldrich), followed by ambient hydrolysis with water vapor for 72 h, then calcined at 450° C. for 4 h to form the interfacial layer. The $ZrO_2$-coated metal foam was saturated with a dilute aqueous $RuCl_3$ solution ($RuCl_3$ hydrate, Aldrich). The saturation process was repeated several times until the desired Ru loading was achieved. The coated metal foam supported Ru catalyst was finally dried at 100° C. in vacuum overnight, followed by calcination at 350° C. for 1 h. Prior to testing, the catalyst was activated with a 10%$H_2$/He mixture at 350° C. for at least 1 h.

A catalytic plug flow reactor (PFR) system was used to test both porous inserts. The PFR was configured in a single-zone furnace as the heat transfer chamber. The reactor system included a steam generator placed directly prior to the reactor inlet, a PFR housed within the furnace, and a condenser located at the reactor outlet. The porous insert was packed in a 7 mm ID quartz tube, which was necked at the center.

The feed water was fed to the steam generator using a Cole Parmer syringe pump. Carbon monoxide and nitrogen (a diluent) were fed to the system using Matheson mass flow controllers. The mixed feed stream flowed through the steam generator before entering the PFR in a downflow fashion. The product gases were directed through the condenser and sent to an on-line gas chromatograph, where the product stream was analyzed.

Two thermocouples were placed inside the catalytic PFR system. One thermocouple was located above the porous insert. The second thermocouple was placed adjacent to the porous insert outside of the quartz tube to measure the furnace temperature. A pressure gauge at the reactor inlet was used to measure the differential pressure across the porous insert.

The product gases were analyzed immediately upon exit from the reactor with a Microsensor Technology Inc., (MTI) M200 Gas Chromatograph. Using a 10-m molecular sieve column (argon carrier gas, 100° C., 34.1 psig) and an 8-m PoraplotU column (helium carrier gas, 65° C., 26.9 psig) in parallel, the GC analyzes for hydrogen, nitrogen, oxygen, methane, carbon monoxide, air, carbon dioxide, ethane, and ethylene in 75 sec. The M200 used a vacuum pump to draw a small sample from the product stream with a 40-sec purge and a 100-millisecond injection time. Water was removed from the gas stream prior to entering the M200.

Carbon monoxide conversion was calculated based on the moles of material in the inlet and outlet gas stream, as shown in equation 1. The selectivity to carbon dioxide (and hydrogen) or methane was calculated in equations 2 and 3, respectively.

$$X_{co}=100*(n_{co\text{-}in}-n_{co\text{-}out})/n_{co\text{-}in} \quad (1)$$

$$S_{CO2}=100*n_{CO2}/(n_{CO2}+n_{CH4}) \quad (2)$$

$$S_{CH4}=100-S_{CO2} \quad (3)$$

Figure 2A:
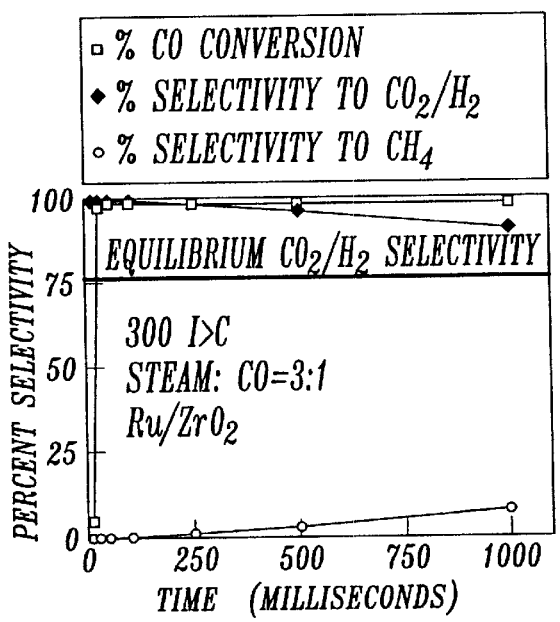
FIG. 2a is a graph of percent selectivity versus residence time for long contact time water gas shift with a powder catalytic porous insert.
Figure 2B:
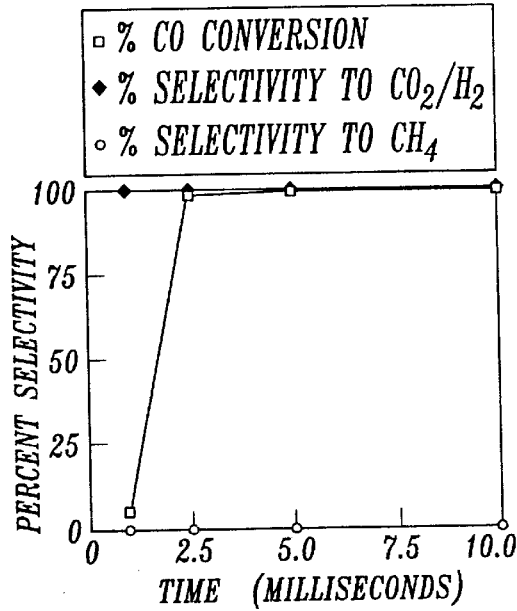
FIG. 2b is a graph of percent selectivity versus residence time for short contact time water gas shift with a powder catalytic porous insert.

Using the first porous insert, fine catalyst powders (65 to 100 mesh), the intrinsic reaction kinetics were approximately measured. The contact time varied from 10 milliseconds to 1 sec. FIGS. 2a and 2b show the performance for long and short contact times. At 300° C. and a steam to carbon ratio of 3:1, 25 milliseconds on the Ru-based catalyst was sufficient to convert greater than 98% of the carbon monoxide to carbon dioxide and hydrogen. At 50 milliseconds, a CO conversion of 99.8% was measured with a selectivity of 100% to the desired products ($CO_2$ and $H_2$). The equilibrium conversion of CO at 300° C. and a steam to carbon ratio of 3:1 was 99.93%.

Tests run with longer contact times (>100 milliseconds) showed the formation of methane, which has an equilibrium selectivity of 22.82%. The equilibrium selectivity line for carbon dioxide and hydrogen is shown on FIG. 2a. As the contact time increased, the formation of methane also increased. A software package, FACT™, was used for all equilibrium calculations.

Figure 3:
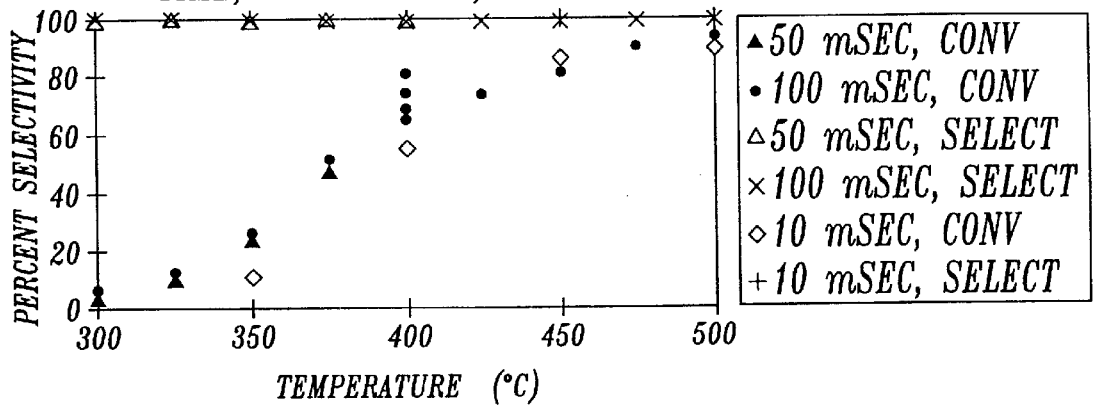
FIG. 3 is a graph of percent selectivity versus temperature for various residence times for water gas shift with a coated metal foam porous insert.

The results with the second porous insert (coated metal foam) are shown in FIG. 3. At 300° C., the CO conversion was less than 10%. However, at 500° C. and a steam to carbon ratio of 3:1, the measured carbon monoxide conversion reached 94% with a contact time of 50 milliseconds. The equilibrium conversion was 94.53% at these conditions. With a contact time as short as 10 milliseconds, the carbon monoxide conversion exceeded 90% and 100% selectivity to carbon dioxide and hydrogen was observed. The equilibrium $CO_2$ selectivity was 93.52% at 500° C.

At the contact times of 10, 50, and 100 milliseconds, the measured selectivity remained near 100%, with methane below the detectability limit of the GC. These findings showed that desired non-equilibrium chemistry was exploited in the coated metal foam. Unwanted series and slow parallel reaction pathways, such as the formation of methane, were effectively shut down.

The second porous insert of the coated metal foam had a higher activation temperature than the first porous insert of catalyst powder for two reasons. First, the catalyst washcoat had a slightly different composition and structure than the catalyst powders. Independent catalyst tests with powders made from the same washcoat verified the higher required activation temperature. The other distinction between the two porous inserts was a reduced weight of active catalyst (approximately 10%) on the coated metal foam.

EXAMPLE 2

An experiment was conducted to demonstrate hydrocarbon steam reforming according to the present invention.

Figure 4:
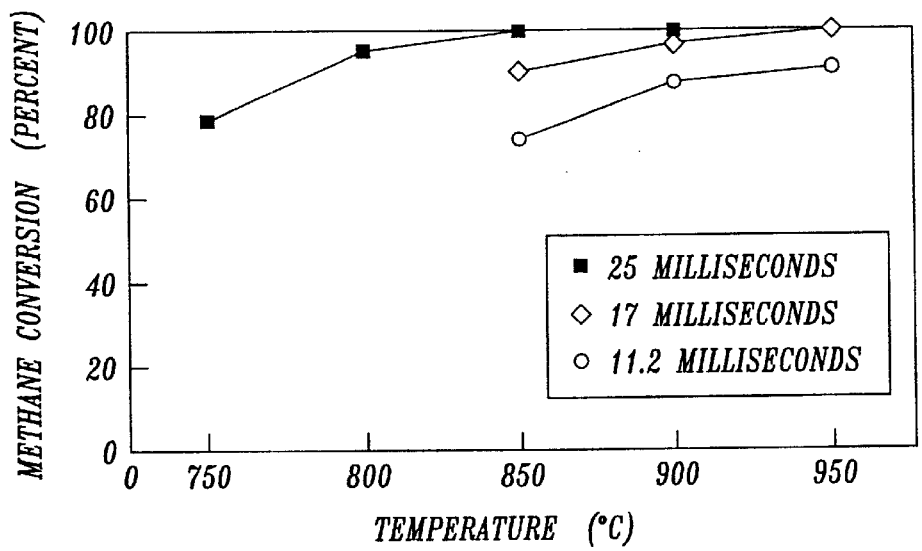
FIG. 4 is a graph of methane conversion versus temperature for various residence times for a steam to methane ratio of 2.5:1.

Using the first porous insert (powder) as in Example 1, methane steam reforming was achieved with 100% conversion at 850° C. in 25 milliseconds on a 5%Rh/γ-$Al_2O_3$ catalyst (FIG. 4). Using the second porous insert (coated metal foam) as in Example 1, with a 5%Rh/γ-$Al_2O_3$ catalyst/interfacial layers on 80 ppi stainless steel metal foam reduced the operating temperature by 100° C. to achieve the same performance at 750° C.

No coke formation was observed during any of the millisecond residence time experiments with lower steam to methane ratios (2.5:1).

Results for other hydrocarbons are shown in Table E2-1 wherein "time" is residence time.

TABLE E2-1

Preliminary hydrocarbon reforming data based on 5% Rh/γ-Al$_2$O$_3$ catalyst screening tests

| Hydrocarbon | Temperature (C.) | Time (ms) | Conversion % | H2 Sel. % |
|---|---|---|---|---|
| Butane | 600 | 25 | 100 | 96 |
| Gasoline | 800 | 50 | 95 | ~95 |
| Iso-octane[A] | 700 | 25 | 100 | 89.5 |
| Kerosene | 600 | 50 | 95 | ~98 |

[A]Catalyst material included a titania buffer layer

Figure 5A:
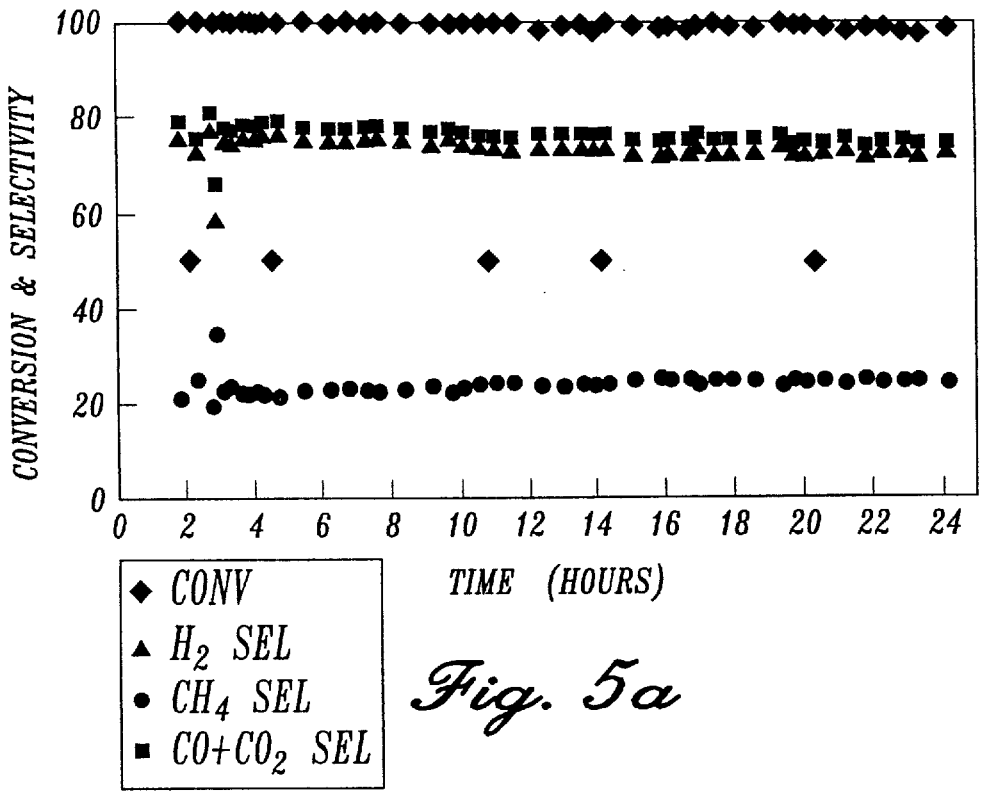
FIG. 5a is a graph of conversion and selectivity versus time for n-butane steam reforming with a porous insert of a porous substrate with interfacial layer and catalyst material.
Figure 5B:
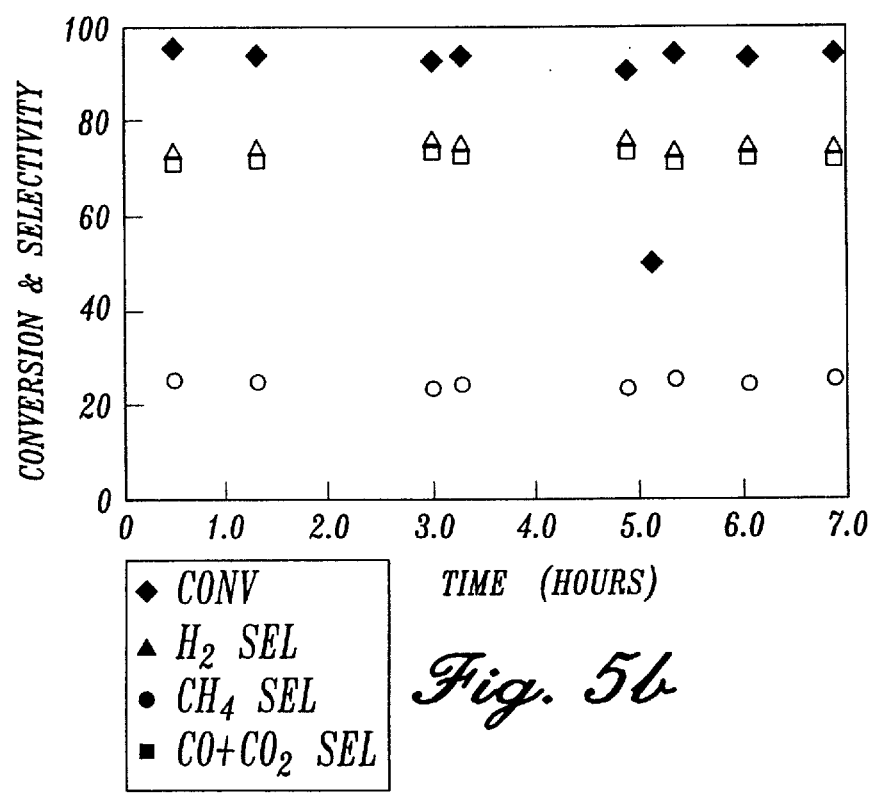
FIG. 5b is a graph of conversion and selectivity versus time for n-butane steam reforming with a regenerated porous insert.

Further data for an n-butane steam reforming experiment are shown in FIG. 5a. A porous insert of 80 ppi stainless steel with an interfacial layer of alumina and a catalyst material of rhodium (15.6 wt % Rh on 17.1 wt % alumina, balance stainless steel foam, no buffer layer). Conditions were 650° C. at 95 ms residence time with a steam to carbon ratio of 3.58:1. The pressure drop increased from negligible to over 7 psig, attributed to cracking and spalling of the interfacial and catalyst layers. The catalyst was regenerated in air to remove deposited carbon. FIG. 5b shows poorer performance. Pressure drop increased to over 7 psig after only 5 operating hours in two days.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for obtaining an enhanced production rate per reaction chamber volume of a reaction chamber having an inlet and an outlet for a thermal chemical reaction, the method comprising the steps of;
   (a) placing a porous insert within said reaction chamber volume, wherein a reactant flow substantially completely passes through said porous insert wherein said reaction chamber volume with said porous insert has a mean porosity less than 1 and a transport distance no greater than 3 mm;
   (b) sizing said reaction chamber volume with a length parallel to a bulk reactant flow, said length less than or equal to 6 inches, and with a height less than or equal to 2 inches, thereby transferring reaction heat at an enhanced heat transfer rate through said porous insert; and
   (c) providing a heat transfer chamber in thermal contact with the reaction chamber volume, said heat transfer chamber transferring heat at said enhanced heat transfer rate across a wall between the heat transfer chamber and the reaction chamber, thereby obtaining the enhanced production rate per reaction chamber volume for the thermal chemical reaction wherein a ratio of said enhanced production rate per reaction chamber volume to a conventional production rate per conventional reaction chamber volume for the thermal chemical reaction is at least 2.

2. The method as recited in claim 1, wherein said thermal chemical reaction is a catalytic chemical reaction.

3. The method as recited in claim 2, wherein a catalyst is on the porous insert.

4. The method as recited in claim 3, wherein said porous insert has a solution deposited interfacial layer thereon, and a catalyst metal on the interfacial layer.

5. The method as recited in claim 4, wherein said porous insert has a buffer layer between the porous support and the solution deposited interfacial layer.

6. The method as recited in claim 5, wherein said buffer layer is a metal oxide.

7. The method as recited in claim 6, wherein said metal oxide is selected from the group consisting of Al$_2$O$_3$, TiO$_2$ and combinations thereof.

8. The method as recited in claim 7, wherein said Al$_2$O$_3$ is selected from the group consisting of (α-Al$_2$O$_3$, γ-Al$_2$O$_3$ and combinations thereof.

9. A method of obtaining a product at an enhanced production rate for a steam reforming thermal chemical reaction per reaction chamber volume of a reaction chamber having an inlet and an outlet, the method comprising the steps of:
   (a) passing a reactant flow through a porous insert within said reaction chamber, wherein the reactant flow substantially completely passes through said porous insert wherein said reaction chamber volume with said porous insert has a mean porosity less than 1 and a mass transport distance no greater than 3 mm, said porous insert comprising a porous support with a catalyst material thereon;
   (b) said reaction chamber with a length parallel to a bulk reactant flow, said length less than or equal to 6 inches, and with a height less than or equal to 2 inches, thereby transferring reaction heat through said porous inset; and
   (c) wherein a heat transfer chamber is in thermal contact with the reaction chamber volume, and heat is transferred through said heat transfer chamber across a wall between the heat transfer chamber and the reaction chamber, wherein said reactant flow comprises a hydrocarbon about 80% 100% of equilibrium conversion of said hydrocarbon is converted at a residence time of less than about 50 milliseconds.

10. The method as recited in claim 9, wherein said porous insert further has an interfacial layer between said porous support and said catalyst material.

11. The method as recited in claim 10, wherein said porous insert further has a buffer layer between said interfacial layer and said porous support.

12. The method of claim 9 wherein the residence time is about 11 to about 50 milliseconds, wherein the porous insert comprises a porous monolith; and wherein the heat exchange chamber has an inlet and an outlet.

13. The method of claim 12 wherein the porous insert comprises a metal foam support, an interfacial layer; and wherein the reaction takes place at about 600 to about 950° C.

14. The method of claim 13 wherein the hydrocarbon is selected from the group consisting of butane, gasoline, iso-octane, and kerosene; and wherein hydrogen is produced with a selectivity about 89% to about 98%.

15. A method of obtaining a product at an enhanced production rate for a water gas shift thermal chemical reaction per reaction chamber volume of a reaction chamber having an inlet and an outlet, the method comprising the steps of:
   (a) passing a reactant flow through a porous insert within said reaction chamber, wherein the reactant flow substantially completely passes through said porous insert wherein said reaction chamber volume with said porous insert has a mean porosity less than 1 and a mass transport distance no greater than 3 mm, said porous insert comprising a porous support with a catalyst material thereon;

(b) said reaction chamber with a length parallel to a bulk reactant flow, said length less than or equal to 6 inches, and with a height less than or equal to 2 inches, thereby transferring reaction heat through said porous insert; and (c) wherein a heat transfer chamber is in thermal contact with the reaction chamber, and heat is transferred to said heat transfer chamber across a wall between the heat transfer chamber and the reaction chamber, wherein said reactant flow comprises water and carbon monoxide, wherein the contact time is less than about 100 milliseconds, and the conversion of carbon monoxide is greater than about 50% of equilibrium conversion.

16. The method of claim 15 wherein the contact time is between 10 and 100 milliseconds, wherein the conversion is greater than 80% and wherein the method has a selectivity of at least about 100% of equilibrium selectivity to carbon dioxide; and wherein the heat exchange chamber has an inlet and an outlet.

17. The method of claim 16 where the porous insert comprises a metal foam supported Ru catalyst.

18. A vessel for obtaining an enhanced production rate per reaction chamber volume of a reaction chamber having an inlet and an outlet for a thermal chemical reaction, the vessel comprising:

(a) a porous insert within said reaction chamber, wherein during operation a reactant flow substantially completely passes through said porous insert wherein said reaction chamber with said porous insert has a mean porosity less than 1 and a mass transport distance no greater than 3 mm;

(b) said reaction chamber having a length parallel to a bulk reactant flow, said length less than or equal to 6 inches, and with a height less than or equal to 2 inches; and (c) a heat transfer chamber in thermal contact with the reaction chamber, said heat transfer chamber comprising an inlet and an outlet and an open space for flow of a heat exchange fluid; and a wall disposed between the heat transfer chamber and the reaction chamber such that, during operation heat transfers across said wall.

19. The vessel as recited in claim 18, wherein said thermal chemical reaction is a catalytic chemical reaction.

20. The vessel as recited in claim 19, wherein a catalyst material is on the porous insert.

21. The vessel as recited in claim 20, wherein said catalyst material is a metal selected from the group consisting of noble metal, transition metal and combinations thereof.

22. The vessel as recited in claim 19, wherein said porous insert has a solution deposited interfacial layer between said porous support and said catalyst material.

23. The vessel as recited in claim 22, wherein said porous insert has a solution deposited interfacial layer between a porous support and the catalyst material.

24. The vessel as recited in claim 23, wherein said porous insert has a buffer layer between the porous support and the solution deposited interfacial layer.

25. The vessel as recited in claim 24, wherein said buffer layer is a metal oxide.

26. The vessel as recited in claim 25, wherein said metal oxide is selected from the group consisting of $Al_2O_3$, $TiO_2$ and combinations thereof.

27. The vessel as recited in claim 22, wherein said porous support is a metal foam.

28. The vessel as recited in claim 22, wherein said porous support is a porous ceramic.

29. The vessel as recited in claim 23, wherein said interfacial layer is a solution deposited metal oxide.

30. The vessel as recited in claim 29, wherein said solution deposited metal oxide is selected from the group consisting of $\gamma Al_2O_3$, $SiO_2$, $ZrO_2$, $TiO_2$ and combinations thereof.

31. The vessel as recited in claim 25, wherein said $Al_2O_3$ is selected from the group consisting of $\alpha$-$Al_2O_3$, $\gamma$-$Al_2O_3$ and combinations thereof.

32. The vessel as recited in claim 18, wherein said buffer layer is a vapor deposited metal oxide.

33. The vessel as recited in claim 32, wherein said vapor deposited metal oxide is selected from the group consisting of $Al_2O_3$, $TiO_2$ and combinations thereof.

34. The vessel as recited in claim 32, wherein said $Al_2O_3$ is selected from the group consisting of $\alpha$-$Al_2O_3$, $\gamma$-$Al_2O_3$ and combinations thereof.

35. The vessel as recited in claim 18 wherein said buffer layer comprises a plurality of sublayers.

36. A reactor for thermal chemical reactions comprising:
a reaction chamber having chamber walls and containing a porous material wherein the porous material is in thermal contact with the chamber walls and has about 20 pores per inch to about 1000 pores per inch;
wherein said reaction chamber has a length of less than or equal to 6 inches and a height of less than or equal to 2 inches; and
wherein, during operation, said length is parallel to a bulk reactant flow; and further comprising a heat transfer chamber in thermal contact with the reaction chamber; wherein the heat transfer chamber comprises an inlet, an outlet and a flow path for a fluid, and wherein a wall separates the reaction chamber from the flow path of the heat transfer chamber.

37. The reactor of claim 36 wherein the porous material comprises a metal foam.

38. The reactor of claim 37 wherein the porous material has a catalyst material thereon and further comprising an interfacial layer between the metal foam and the catalyst material.

39. The reactor of claim 38 wherein the interfacial layer comprises a metal oxide.

40. The reactor of claim 37 wherein, during operation, rectant flow is capable of substantially completely passes through the metal foam.

41. The reactor of claim 36 wherein the reaction chamber has an interior surface and the porous material contacts raised features on the interior surface of the reaction chamber.

42. The reactor of claim 36 wherein the reaction chamber has an interior surface and the porous material rests on raised features on the interior surface of the reaction chamber.

* * * * *